(12) United States Patent
Kim (10) Patent No.: US 7,707,969 B2
(45) Date of Patent: May 4, 2010

(54) METHOD AND APPARATUS FOR INDUCING ARTIFICIAL HIBERNATION OF MARINE ANIMAL

(75) Inventor: Wan Soo Kim, Gyeonggi-do (KR)

(73) Assignee: Korea Ocean Research and Development Institute (KR)

( * ) Notice: Subject to any disclaimer, the term of this patent is extended or adjusted under 35 U.S.C. 154(b) by 276 days.

(21) Appl. No.: 11/863,829

(22) Filed: Sep. 28, 2007

(65) Prior Publication Data

US 2008/0216758 A1 Sep. 11, 2008

(30) Foreign Application Priority Data

Mar. 6, 2007 (WO) ............... PCT/KR2007/001092

(51) Int. Cl.
*A01K 61/00* (2006.01)
(52) U.S. Cl. ..................................... 119/215
(58) Field of Classification Search ............... 119/200, 119/201, 204, 205, 214, 215, 216, 217, 231, 119/234
See application file for complete search history.

(56) References Cited

U.S. PATENT DOCUMENTS

| | | | |
|---|---|---|---|
| 5,309,868 A | 5/1994 | Tomiyama |
| 5,310,427 A | 5/1994 | Manome |
| 6,557,492 B1 | 5/2003 | Robohm |

*Primary Examiner*—Thomas Price
(74) *Attorney, Agent, or Firm*—Rodman & Rodman (57) ABSTRACT

A method and an apparatus for inducing artificial hibernation of marine animal, wherein the temperature of sea water with marine animals is gradually lowered in stepwise process, while the sea water temperature is kept as is for a predetermined period of time at each step of lowering temperature, whereby the predetermined period of time maintained for each step of the lowered temperature is gradually increased to a point where changes of oxygen consumption by the marine animals greatly decreased or the changes of oxygen consumption is reached almost zero, and starting from this point, the time of constantly maintaining the sea water temperature at each step is gradually reduced to thereby ensuring a long survival rate (viability) of marine animals.

18 Claims, 7 Drawing Sheets

METHOD AND APPARATUS FOR INDUCING ARTIFICIAL HIBERNATION OF MARINE ANIMAL

TECHNICAL FIELD

The present invention relates to a method and an apparatus for inducing artificial hibernation of marine animals, and more particularly to a method and an apparatus capable of gradually decreasing temperature of water including the marine animals within, and also capable of expanding the period of each subjected temperature in stepwise increment for inducing artificial hibernation of marine animals.

BACKGROUND ART

Rapid improvement of fish raising technologies (aquaculture) in 1980s has prompted a significant increase of high value or quality fishery products from aquaculture farms even in Korea starting from early part of 1990s (total mariculture fishery products in 1997: 39,121 tons), and demand and consumption of live fish (the word "fish" is used herein to include fin fish such as halibuts, crustaceans such as crabs, and shellfish such as clams and other aquatic animals) has greatly increased partially due to increased personal income. However, current domestic circulation of aquatic fisheries products including live fishery products depends on low density (approximately 15-20% of total weight) transportation systems using trucks equipped with water filled tanks which results in many associated distributional problems including difficulty in maintaining freshness due to delay in delivery caused by transportation problems such as traffic congestion; expensive transportation cost due to high fuel/labor costs and distance from farm and final consumers; and spoiled taste when the live fish is hauled long distances over land.

The typical methods of transporting such marine animals including live fish can be broadly categorized into four types, that is, (1) anesthetic transport, (2) electric shock transport, (3) cooling tank transport, and (4) artificial (dormant state of) hibernation transport.

To be more specific, one such recent system and method for transporting the live fish are described in Korean Patent Registration No. 10-0232408 entitled as "high density transport method of live fish using cooled water", in which water, ice and salt are filled into a live fish water tank, and the temperature of water therein is cooled by 5~15 degrees Celsius lower than the typical transport water temperature.

Other systems and methods are disclosed, for example, in Korea Patent Registration No. 10-0531728 entitled as "icy sea water cooling apparatus for live cuttlefish transport and storage" in which an icy seawater cooling apparatus is proposed for storage and transportation of cuttlefish in icy state of low temperature. Korea Patent Registration No. 10-0046109 entitled as "method and apparatus for storage and transportation of live fish" provides that a tank with several holes is maintained in low temperature for accommodating in each hole one or more fish to protect live fish from being bodily injuries and restraining the fish from moving freely.

However, as all these disclosures basically require a method for lowering temperature of water tank containing live fish, there are still problems in the live fish tank transportation methods of distributing live consumables with truck delivery system for domestic as well as foreign consumptions (hereinafter referred to as "tank transport"). Such specialized equipment for distribution is costly, and uncertainties of low temperature environment also have surfaced for various kinds of fish. In addition, high mortality of live fish persists during the long haul of transportation over land. Furthermore, the anesthetic transport method may cause hygienic safety problems and abhorrence. Another method such as the electric shock transport method may also pose a difficulty in pre-treatment, high morality rate, and deteriorated flesh quality of live fish.

DETAILED DESCRIPTION OF THE INVENTION

Technical Problem

The present invention aims at solving the aforementioned problems by which temperature of sea water containing marine animals is lowered in stepwise process, while the subjected sea water temperature for such process is kept for a predetermined period of time at each step of lowering temperature, whereby the predetermined period maintained for each step of the lowered temperature is gradually increased to a point where changes of oxygen consumption (oxygen requirement) by the marine animals is greatly decreased or the changes in oxygen consumption reached to almost nothing. Then from starting from this point, the period for constantly maintaining the desired temperature of sea water at each step is gradually reduced, thereby ensuring a long survival rate (viability) of marine animals.

The object is to keep a long survival rate of marine animals just by artificially inducing dormancy in the marine animals and packaging the artificially dormant-induced aquatic animals in a box under waterless condition. The present invention is to use an endogenous biological rhythm (biorhythm) of all the living marine animals in transporting live marine animals, apart from the existing live fish transport. In other words, the present invention is to provide an absolutely different technique of maintaining live marine animals during distributional phase by artificially inducing a waterless condition for the living marine animals by stopping the endogenous biorhythm for a long time and by allowing external environments of the living marine animals to go through various temperature changes in response to the biorhythms of the living marine animals. Also, this invention is capable of artificially induced hibernating marine animals to recover their biorhythm after long transportation.

Technical Solution

In one preferred embodiment of the invention, a method for inducing artificial hibernation of marine animals comprises: maintaining marine animals in sea water for a predetermined period of time; gradually decreasing the sea water temperature according to each predetermined section of temperature (biorhythm) and then gradually increasing the period for the fish to be kept at certain sea water temperature at each step of decreasing temperature in stepwise process, and then gradually decreasing the period for the fish to be kept at certain temperature at each step of decreasing temperature in stepwise process, starting from a point of sea water temperature where there is no deviation of mean oxygen consumption consumed by the marine animal under a constant temperature.

In another preferred embodiment of the invention, an apparatus for inducing artificial hibernation of marine animals comprises: an artificial dormant chamber containing sea water including marine animals; a heat exchanger or a cooler for gradually lowering temperature of the sea water discharged from the artificial dormant chamber according to a predetermined section of temperature and introducing the lowered temperature of sea water back into the artificial dormant chamber; temperature sensors for measuring the temperature of sea water contained in the artificial dormant chamber; an oxygen sensor for measuring the level of dissolved oxygen contained in the sea water; and a personal computer system for controlling the heat exchanger or the cooler according to an artificial hibernation software program, the program being such that temperature of the sea water lowered at each step can be maintained for a predetermined period of time, based on temperature information of the sea water received from the temperature sensors while increasing the predetermined period maintained at each step of decreasing temperature. And based on the information on the level of dissolved oxygen received from the oxygen sensor, the period of maintaining constant temperature of the sea water gradually lowered at each step is gradually decreased from the sea water temperature from which there is no deviation of the level of the dissolved oxygen consumed by the marine animals.

The preferred embodiments of the present invention will be described in detail in the following with reference to the drawings.

The present invention aims to artificially induce a dormant state of hibernation in the marine animals, where temperature of sea water including the marine animals is gradually lowered, and the sea water maintaining period at each step of lowered temperature is increased or expanded in stepwise process.

To this end, first, marine animals are left to swim in sea water for a predetermined period of time. In other words, the sea water including the marine animals is prepared as the first step. The sea water denotes water from the ocean, but fresh water and other water may be used in the present invention, apart from the sea water. Although exemplary embodiments of the present invention have described sea water for the sake of convenience, it should be apparent that fresh water and other types of water may be used apart from the sea water.

Next, the temperature of sea water thus prepared is gradually lowered at each predetermined temperature section, and the period of maintaining the sea water at each temperature lowering step is gradually increased in stepwise process. In other words, the temperature of prepared sea water is gradually lowered but the sea water temperature at each lowering step of temperature is maintained for a predetermined period, from which the predetermined period of time for maintaining each step of lowered temperature is gradually increased.

It is well known that marine animals can be kept in good condition for longer time if they are kept in water that is significantly cooler than water normal for their usual habitat or in ice, whereas the feature of the present invention is such that water temperature is lowered at a predetermined interval to induce dormancy.

Figure 1:
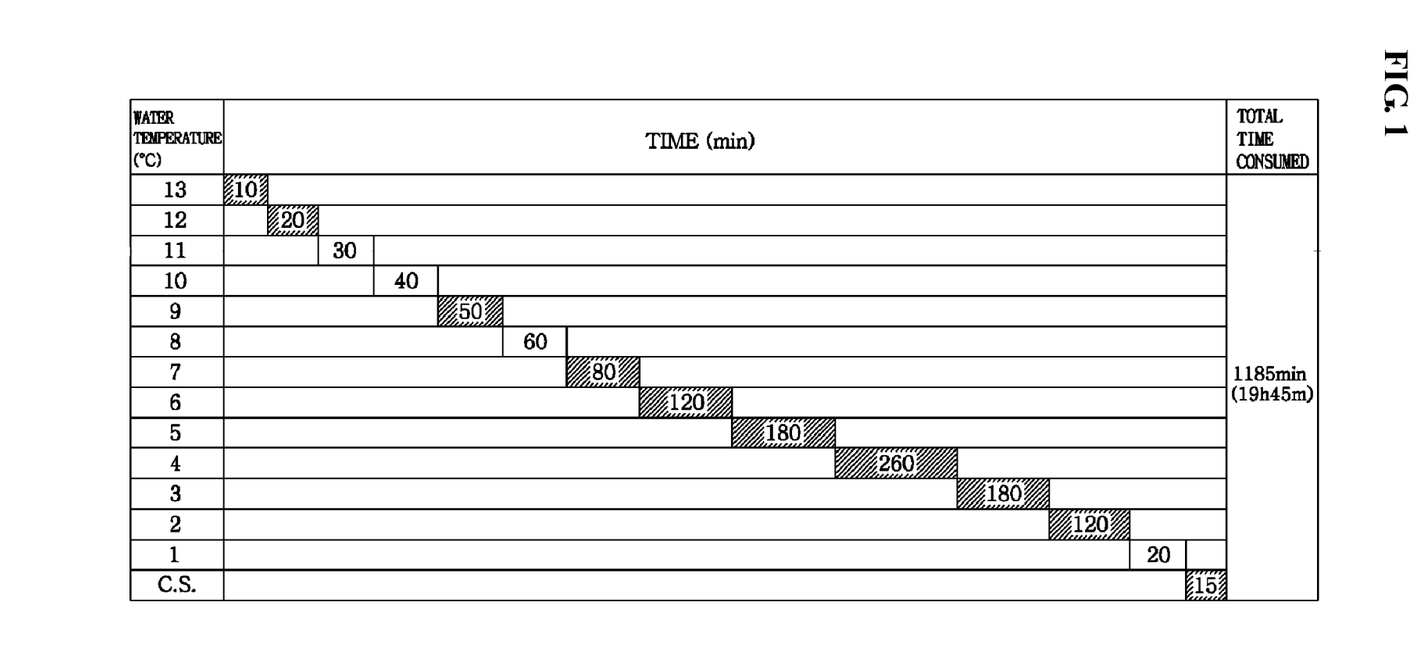
FIG. 1 is a mimetic diagram explaining a first exemplary embodiment of the present invention where the period of the marine animals kept under predetermine temperature is gradually increased in response to gradually lowered sea water temperature.

As shown in an exemplary drawing of FIG. 1, if the prepared sea water is 13 degrees Celsius, and marine animals are left to stay therein for 10 minutes, the sea water temperature is gradually lowered at each step 1 degree Celsius, and the duration of temperature of sea water exposed to contained the marine animals (each lowered step of temperature) is gradually increased to 20 minutes, 30 minutes, 40 minutes and 50 minutes at 12 degrees Celsius, 11 degrees Celsius, 10 degrees Celsius and 9 degrees Celsius (hereinafter all the temperatures are based on Celsius), respectively.

ADVANTAGEOUS EFFECTS

As apparent from the previous sections, there is an advantage in the present invention thus described, in that, temperature of sea water with marine animals is lowered stepwise, while the sea water temperature is kept at a predetermined period of time for each phase of lowered temperature. And then this predetermined period of time maintained for each phase of the lowered temperature is gradually increased to a point where the changes of oxygen consumption (oxygen requirement) by the marine animals greatly decrease or the changes of oxygen consumption reached almost nothing. And starting from this point, the period of constantly maintaining the sea water temperature at each step is gradually reduced, thereby ensuring a long survival rate (viability) of marine animals.

BEST MODE

It was confirmed from the embodiments of the present invention that the aquatic animals could be most effectively induced to dormant state of hibernation by gradually reducing sea water temperature at a predetermined interval and then gradually increasing the period of animals maintained at predetermined temperature at each phase of decreased temperature. If the sea water temperature is temporarily lowered at one time, the aquatic animals can be subjected to death due to severe stress on their physiological process caused by significantly reduced temperature, such that, in the present invention, water temperature and duration are gradually adjusted step by step to allow the aquatic animals to be adapted to the reduced temperature.

Figure 2:
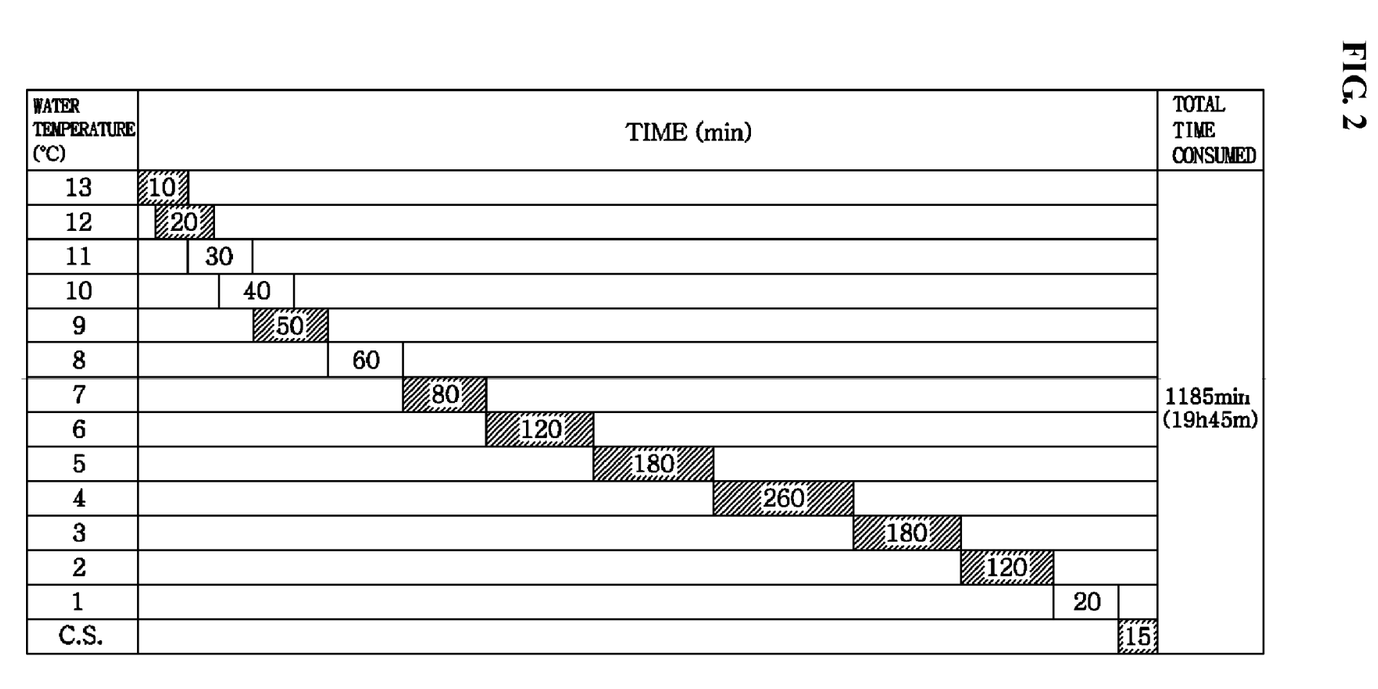
FIG. 2 is a mimetic diagram explaining a second exemplary embodiment of the present invention where the period of the marine animals kept under predetermine temperature is gradually increased in response to gradually lowered sea water temperature.

Referring to FIG. 1, the sea water temperature may be gradually lowered by 1 degree Celsius per predetermined temperature section, and it should be apparent that the sea water temperature may be gradually lowered by 2, 3 or more degrees Celsius per predetermined section, where the duration of time for each temperature may vary. For example, if the prepared sea water is maintained at 13 degree Celsius, and if an aquatic animal is kept therein for 10 minutes, the duration of time at 11 degree Celsius is given 20 minutes, and the duration of time at 9 degree Celsius is set at 30 minutes. Furthermore, it is needless to say that, although the gradual decrease of temperature of the sea water with the aquatic animals and the gradual increase of period of animals maintained at predetermined temperature of sea water at each step may clearly distinguish respective sea water temperatures according to duration of period, some of the time sections may be overlapped in between two adjacent temperatures as shown in FIG. 2.

The next feature of the present invention is that, following the gradual decrease of the sea water temperature and the gradual increase of period of animals maintained at predetermined temperature of sea water, the period of animals maintained at predetermined constant temperature of sea water for each phase is gradually decreased, starting from where changes of oxygen requirements are greatly reduced, or remain almost unchanged. In other words, the sea water temperature from which the aquatic animals are most stressed is determined from the respiratory state or endogenous biorhythm of aquatic animals, and then, the period of animals maintained at experimentally determined constant temperature of sea water for each phase for inducing the hibernation is gradually increased, thus minimizing the stress affecting the aquatic animals.

If the sea water temperature is reduced, the aquatic animals in the sea water would experience difficulties in breathing and their respiration would become irregular, whereby changes of the oxygen requirements consumed by the aquatic animals would be greatly reduced or remain almost zero at a predetermined temperature. This implies that respiratory biorhythm of the aquatic animals has significantly reduced or has ceased, and the aquatic animals are most stressed during this temperature phase. The present invention is, therefore, featured in such a manner that the period of animals maintained at predetermined constant temperature of sea water for each phase is increased the longest at a sea water temperature where the changes of the oxygen requirements consumed by the aquatic animals are greatly reduced, remained almost nothing or nothing at a predetermined temperature. And, subsequently, the period of animals maintained at predetermined constant temperature of sea water for each phase gradually reduced from the lowered sea water temperature thereby minimizing the stresses borne by the aquatic animals as well as artificially inducing a dormant state of hibernation in the aquatic animals.

At this time, the meaning of the "changes of the oxygen requirements consumed by the aquatic animals are greatly reduced, or remained almost nothing" denotes that changes of oxygen consumed by aquatic animals at each gradually lowered sea water temperature, i.e., deviation (i.e., amplitude) between maximum oxygen consumption and minimum oxygen consumption have greatly reduced, or the deviation is nominal. The implication of the "amplitude of oxygen consumption by the aquatic animals analyzed at a predetermined temperature is nominal" is that respiratory activities of the aquatic animals have diminished by the stress. The implication of the "amplitude of oxygen consumption by the aquatic animals analyzed at a predetermined temperature is great" is that the respiratory activities are vigorous, where, both (i.e., diminished and vigorous respiratory activities) cases of which may be checked by changes of oxygen dissolved in the sea water.

In the beginning, if a marine animal consuming an initial oxygen quantity is kept for a predetermined period of time at a predetermined sea water temperature, the description of keeping a marine animal of an initial oxygen consumption in sea water of a predetermined temperature for a predetermined period of time and gradually lowering the sea water temperature in phase according to predetermined sections and keeping the sea water temperature for a predetermined duration of time for each said step-down temperature but gradually increasing the predetermined duration of time that is kept at each lowered step of temperature is the same as above, whereas the other embodiment is featured in that the predetermined duration of time that the subjected marine animals are kept at each step-down temperature is reduced, starting from a point of sea water temperature where the oxygen consumed by the marine animals is 1.5 to 4 times smaller than the initial oxygen consumption or where a deviation of oxygen consumption by the marine animals is in the range of 6.0 ml $O_2$ $kg^{-1}$ WW $h^{-1}$~0.0 ml $O_2$ $kg^{-1}$ WW $h^{-1}$.

MODE FOR INVENTION

In order to check for a deviation of oxygen consumption by the aquatic animals at a predetermined temperature, a respiratory state of the aquatic animals should be measured during or in advance, prior to the implementation stage of the present invention. Therefore, the present invention further includes the measuring process of respiratory state of the aquatic animals. The oxygen consumption of the aquatic animals would be known by measuring the dissolved oxygen in the sea water containing the aquatic animals, and an automatic respiration measuring apparatus is particularly employed in the present invention for measuring the respiratory state of the aquatic animals.

Although there is no particular restriction for checking a respiratory state of marine animals, an automatic respiration measuring apparatus (Korea laid-open Patent No. 10-2003-0075931) invented by and registered for the present inventors may be used. The apparatus (FIG. 3), designed to automatically correct a dissolved oxygen concentration and an atmospheric pressure for measuring the respiratory state of aquatic animals, includes a main closed-circulation loop in which water is circulated, an aquatic animal storage tank arranged to communicate with the main closed-circulation loop for storing and maintaining the aquatic animals, a parallel-connected auxiliary circulation loop with the main closed-circulation loop for supplying the supplementary water saturated and dissolved with oxygen to the main closed-circulation loop, and a computing control system for communicating the auxiliary circulation loop with the main closed-circulation loop for measuring the dissolved oxygen in the main closed-circulation loop. The detailed explanation for measuring the respiratory state of aquatic animals using the apparatus is as in the description of the automatic respiration measuring apparatus (Korea laid-open Patent No. 10-2003-0075931) invented by and registered for the present inventors. Moreover, it is clear from above description that the measurement of respiratory state of aquatic animals using the above particular apparatus and method or other methods and apparatus known to the users of the present artificial hibernation invention technique also belong to the scope of the present invention.

Figure 4:
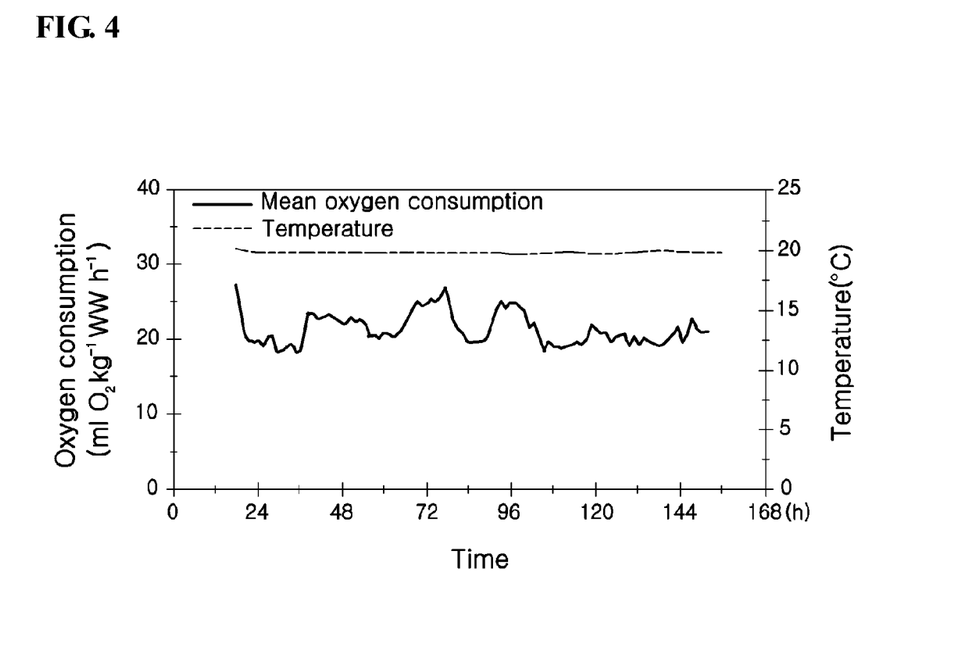
FIGS. 4 and 5 each show an exemplary graph illustrating a respiratory state of cultured marine animal measured according to the present invention and a cyclic rhythm obtained from the respiratory state.
Figure 5:
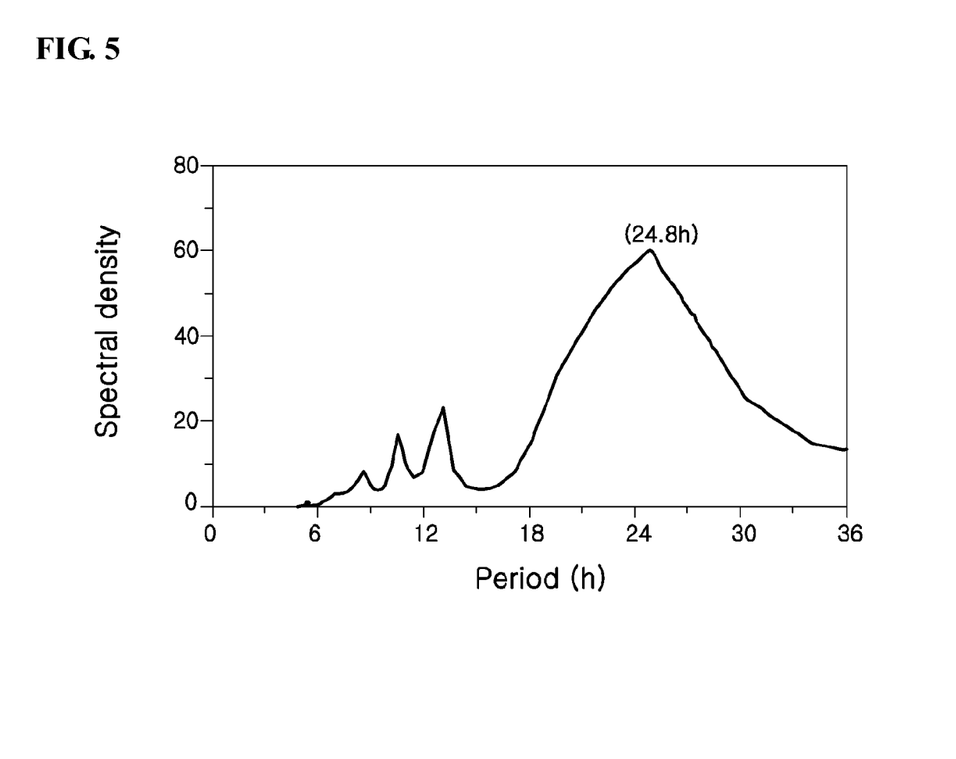
Figure 6:
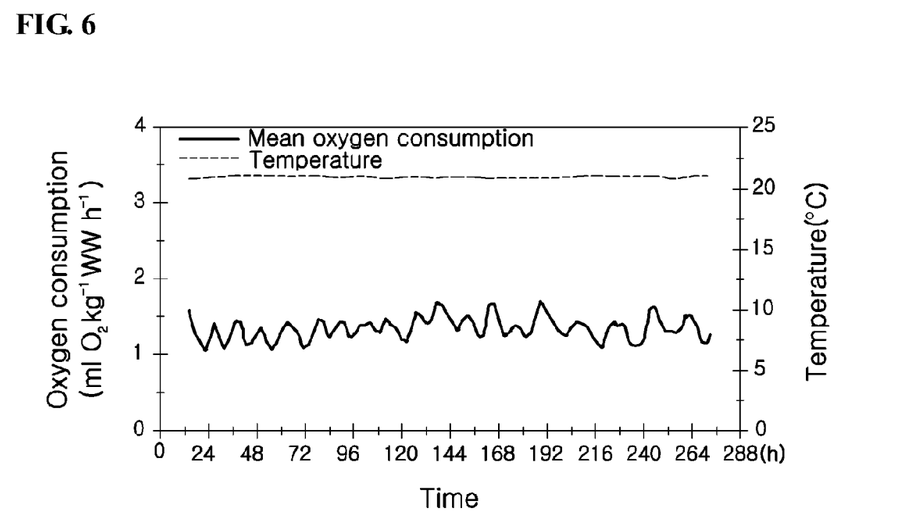
FIGS. 6 and 7 each show an exemplary graph illustrating a respiratory state of cultured marine animal measured according to the present invention and circadian or circadian rhythms obtained from the respiratory state.
Figure 7:
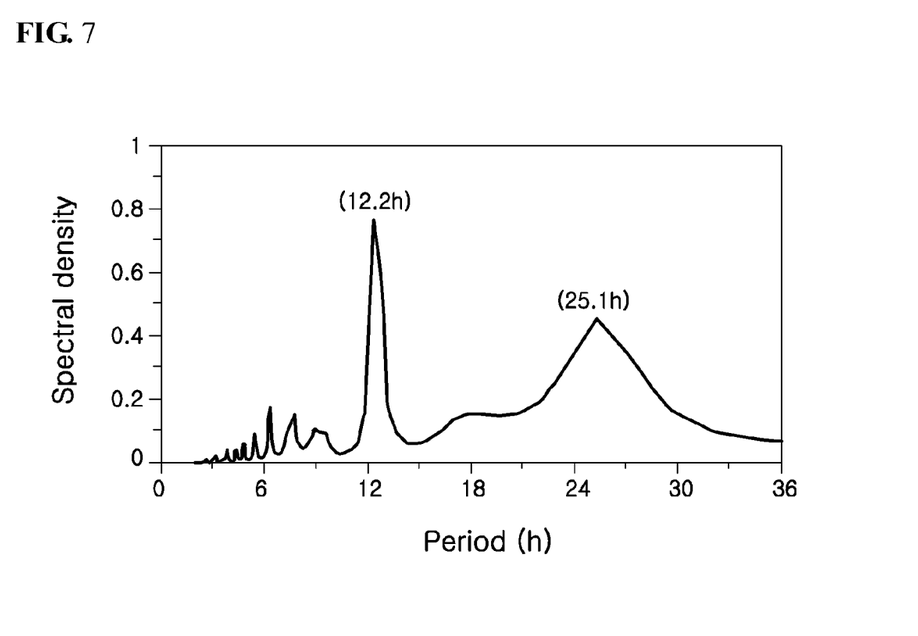

At the same time, endogenous biorhythm of the aquatic animals may be analyzed from the result of the respiratory state of the aquatic animals thus measured in the present invention. Preferably, the endogenous biorhythm of the aquatic animals is obtained from a constant experimental condition of "no light", sea water temperature and salinity. Changes of dissolved oxygen consumed by the aquatic animals are continuously and automatically measured in an experimental container equipped with said experimental conditions. And, a mean oxygen consumption that has changed during a predetermined period of time is obtained to analyze the endogenous biorhythm of the aquatic animals. At this time, changes of atmospheric pressure, water temperature and salinity that have a great influence on the oxygen dissolved in the water may be automatically corrected, if necessary. For example, it can be checked from the result of respiratory state of the aquatic animals whether metabolic activities of the aquatic animals have a cyclic rhythm or a circatidal rhythm. In other words, FIG. 4 shows an exemplary graph illustrating biological respiratory activities of a cultured halibut measured consecutively for 6 days using the automatic respiration measuring apparatus, from which a metabolic activity cycle of the aquatic animal was analyzed using a time series cycle analysis program based on the consecutively measured data. Based on the analysis, a robust cyclic rhythm can be obtained, as shown in FIG. 5. FIG. 6 shows a result of continuous biological respiratory activities measured from a halibut captured in the natural habitat, and FIG. 7 is an analysis of the result of continuous biological respiratory activities measured by the cycle analysis program to show that circatidal rhythms formed in the natural habitat exist within the body of the aquatic animal. The analysis of endogenous biorhythms of aquatic animals resulting from the respiratory state of the aquatic animals may be obtained using a predetermined computer system or a program, or may be obtained using other methods widely known in the related field.

As described above, the present invention is featured in such a way that sea water temperature from which the aquatic animals are most stressed is identified from the respiratory state or endogenous biorhythm of aquatic animals, and the period of animals maintained at predetermined constant temperature of sea water for each phase is lengthened to the longest thereby minimizing the stress affecting the aquatic animals, and said feature may be equally applied to aquatic animals having cyclic rhythms or circatidal rhythms, or having both the cyclic and the circatidal rhythms.

Figure 8:
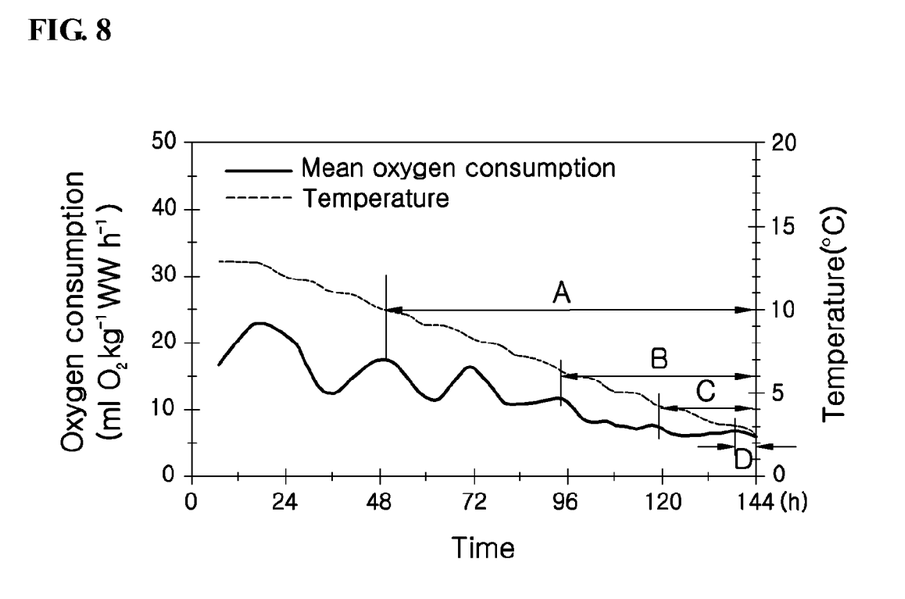
FIG. 8 is an exemplary graph illustrating changes of oxygen consumption of marine animal in response to sea water temperature for determining the sea water temperature of a point where the change of oxygen consumption of the marine animal is greatly reduced or remains almost nothing.

FIG. 8 is an exemplary graph illustrating changes of oxygen consumption of marine animals in response to sea water temperature for determining a sea water temperature of a point where the changes of oxygen consumption of the aquatic animals is greatly reduced or remains almost unchanged. FIG. 8 is an exemplary graph illustrating changes of mean oxygen consumption of the aquatic animals in response to the sea water temperature, and representing a halibut having a 24-hour cyclic rhythm.

Referring to FIG. 8, the changes of mean oxygen consumption can be ascertained to rate decrease as the sea water temperature gradually decreases in phase in actual, and the deviation of oxygen consumption by the aquatic animals at a predetermined temperature, i.e., a difference between maximum oxygen consumption and minimum oxygen consumption by the aquatic animals based on a single temperature also decreases as the sea water temperature is reduced. This proves that aquatic animals become less active at the reduced sea water temperature, and as a result, the changes of oxygen consumption decrease or reach zero state.

The meaning of the changes of oxygen consumption decreasing or reaching zero state denotes that there is a change in the endogenous biorhythms of the aquatic animals, and as shown in FIG. 8, the sea water temperatures on which the endogenous biorhythms are changed may include, in case of using sea water at 13 degree Celsius, a vicinity of 10 degree Celsius where the respiratory metabolic activities of a halibut weakens from a normal state (FIG. 8A), a vicinity of 6 degrees Celsius where the respiratory endogenous biorhythms are greatly changed in response to the decreased water temperature (FIG. 8B), a vicinity of 4 degree Celsius where the respiratory endogenous biorhythms cease (FIG. 8C), and a vicinity of 2 degree Celsius where there is no change of metabolic activities regardless of the further decreased water temperature (FIG. 8D).

Subsequently, in gradually reducing the water temperatures for implementing another embodiment of the present invention, the first temperature may encompass a range of 14 to 12 degree Celsius, the second temperature may encompass a range of 7 to 5 degree Celsius, and the third temperature may encompass 3 degree Celsius. Preferably, the first temperature at 13 degree Celsius, the second temperature at 6 degree Celsius and the third temperature at 4 degree Celsius are desirable, whereby the sea water temperature may be sequentially reduced following the first, second and third temperature phases, or may be reduced from the first temperature to the third temperature phase skipping the second temperature phase.

In other words, a preferred embodiment of the present invention may relate to a method for inducing artificial hibernation of marine animals where a marine animal having the earliest oxygen consumption rate is kept for the first hour in a sea water of the first temperature, and successively, the temperature is gradually lowered and the marine animal is maintained in sea water having the third temperature at the third hour. At this time, the third temperature means a temperature of a third oxygen consumption where oxygen consumption by the marine animal is three to four times smaller than the first oxygen consumption, and the third hour is a duration of 10 to 100 times longer than the earliest first hour.

The above description can be further elaborated with reference to Table 1 (described later) and FIG. 1. A marine animal having the earliest measured first oxygen consumption of 12.2 ml $O_2$ $kg^{-1}$ WW $h^{-1}$ is kept for 10 minutes at 13 degree Celsius of sea water, from where, the water temperature is gradually lowered and the oxygen consumption is reached at 0.1 ml $O_2$ $kg^{-1}$ WW $h^{-1}$ at 4-degree Celsius water temperature where the respiratory endogenous biorhythm stops is maintained for approximately 260 minutes. As noted above, if that marine animal is kept at the third hour about 10 to 100 times longer than the first hour at the third temperature phase 3 to 4 times lower than the earliest first oxygen consumption, the marine animal may be least stressed as the marine animal is maintained therein for the longest period of time, although the third temperature phase is where the marine animal is the most stressed with almost no change of oxygen consumption.

In another embodiment of the present invention, the aquatic animal of first oxygen consumption in the earliest first temperature phase of sea water may be maintained for the first hour in the first temperature phase of sea water. And, the water temperature may be gradually lowered, and the water temperature may be maintained for the second hour at the second temperature (The second temperature is a temperature of second oxygen consumption which is 1.5 to 2.5 times lower than the first oxygen consumption, and the second hour is a duration of maintained period which is 10 to 25 times longer than the first hour). Thereafter, the water temperature may be gradually lowered and the water temperature may be maintained for the third hour at the third temperature (The third temperature is a temperature of third oxygen consumption which is 3 to 4 times lower than the first oxygen consumption, and the third hour is a duration of maintained period which is 26 to 100 times longer than the first hour).

Now, referring to Table 1 and FIG. 1, an aquatic animal having the first oxygen consumption of 12.2 ml $O_2$ $kg^{-1}$ WW $h^{-1}$ is maintained for 10 minutes at 13 degree Celsius of sea water, then at 6 degree Celsius for 120 minutes where the oxygen consumption reached 9.8 ml $O_2$ $kg^{-1}$ WW $h^{-1}$, and the respiratory endogenous biorhythms markedly changed, and then, at 4 degree Celsius for approximately 260 minutes where the mean oxygen consumption of the aquatic animal reached 6.2 ml $O_2$ $kg^{-1}$ WW $h^{-1}$ and the respiratory endogenous biorhythms considered at the ceased state (amplitude difference being of 0.1 ml $O_2$ $kg^{-1}$ WW $h^{-1}$). At this time, the second temperature is where the oxygen consumption change is greatly decreased and maintained for a predetermined period of time before the third temperature to thereby ensure a long survival rate (viability) of aquatic animals.

Meanwhile, another embodiment of the present invention may include the steps of keeping the aquatic animal in a sea water of the first temperature for the first hour, where the water temperature is gradually lowered to the third temperature which is the difference between the maximum and minimum oxygen consumption by the aquatic animal, i.e., an oxygen consumption biorhythm amplitude of 1.1 ml $O_2$ $kg^{-1}$ WW $h^{-1}$~0.0 ml $O_2$ $kg^{-1}$ WW $h^{-1}$, and maintaining the aquatic animal at the third temperature for a duration 10 to 100 times longer than the first hour.

Referring again to Table 1 and FIG. 1, the third temperature where the difference between the maximum and minimum oxygen consumption by the aquatic animal is in the range of 1.1 ml $O_2$ $kg^{-1}$ WW $h^{-1}$~0.0 ml $O_2$ $kg^{-1}$ WW $h^{-1}$ with the range of 4.5~1 degree Celsius. And in this case, the third temperature is where the aquatic animal is most stressed due to almost no change of oxygen consumption, but the third temperature may be maintained for the longest period thereby giving the least stress to the aquatic animal according to the present invention.

Still another embodiment of the present invention may include the steps of keeping the aquatic animal in sea water of the first temperature for the first hour, from where the water temperature is gradually lowered to the third temperature, which is the difference between the maximum and minimum oxygen consumption by the aquatic animal, i.e., an oxygen consumption biorhythm amplitude of 1.1 ml $O_2$ $kg^{-1}$ WW $h^{-1}$~0.0 ml $O_2$ $kg^{-1}$ WW $h^{-1}$, and maintaining the aquatic animal at the third temperature for a duration 10 to 100 times longer than the first hour.

Referring again to Table 1 and FIG. 1, the third temperature which is the difference between the maximum and minimum oxygen consumption by the aquatic animal, i.e., an oxygen consumption biorhythm amplitude of 1.1 ml $O_2$ $kg^{-1}$ WW $h^{-1}$~0.0 ml $O_2$ $kg^{-1}$ WW $h^{-1}$, is approximately in the range of 4.5 to 1 degree Celsius, and in this case, the third temperature is where the aquatic animal may be most stressed due to near unchanged oxygen consumption, but as the aquatic animal is maintained therein for the longest period of time, the aquatic animal may be least stressed.

Still another embodiment of the present invention may include the steps of maintaining the aquatic animal in sea water of the first temperature for the first hour, from where the water temperature is gradually lowered to the second temperature, which is the difference between the maximum and minimum oxygen consumption by the aquatic animal, i.e., an oxygen consumption biorhythm amplitude of 6.01 ml $O_2$ $kg^{-1}$ WW $h^{-1}$~1.0 ml $O_2$ $kg^{-1}$ WW $h^{-1}$, and keeping the aquatic animal at the second temperature for a duration 10 to 25 times longer than the first hour, and gradually lowering the water temperature to the third temperature which is the difference between the maximum and minimum oxygen consumption by the aquatic animal, i.e., an oxygen consumption biorhythm amplitude of 1.1 ml $O_2$ $kg^{-1}$ WW $h^{-1}$~0.0 ml $O_2$ $kg^{-1}$ WW $h^{-1}$, maintaining the aquatic animal at the third temperature for a duration 10 to 100 times longer than the first hour.

Referring again to Table 1 and FIG. 1, the second temperature which is the difference between the maximum and minimum oxygen consumption by the aquatic animal, i.e., an oxygen consumption biorhythm amplitude of 6.0 ml $O_2$ $kg^{-1}$ WW $h^{-1}$~10 ml $O_2$ $kg^{-1}$ WW $h^{-1}$ is at the approximately in the range of 7.0 to 4.5 degree Celsius, and in this case, the second temperature is where the changed oxygen consumption is greatly reduced, which is kept for a predetermined period of time prior to the third temperature to thereby ensure a long survival rate (viability) of aquatic animals.

Furthermore, the gradual decrease of the water temperature in the aforementioned embodiments of the present invention is preferred to gradually reduce the water temperature at each predetermined section, where the duration of maintaining the water temperature at each reduced temperature is gradually increased. At the same time, the aquatic animal in the several described above embodiments is preferred to be a live fish or a halibut.

Figure 10:
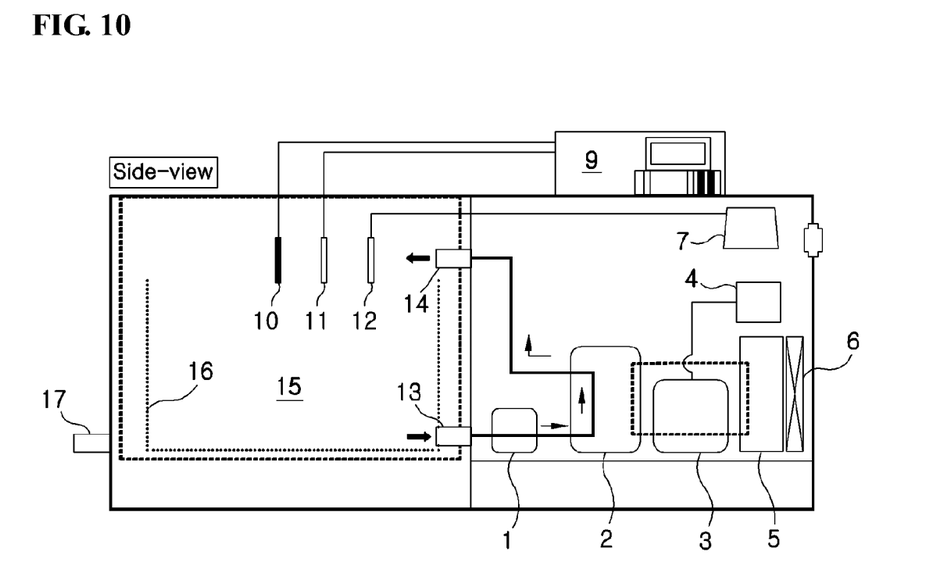
FIGS. 10 and 11 each show a side view and an upper view illustrating an exemplary artificial hibernation apparatus according to another embodiment of the present invention.
Figure 11:
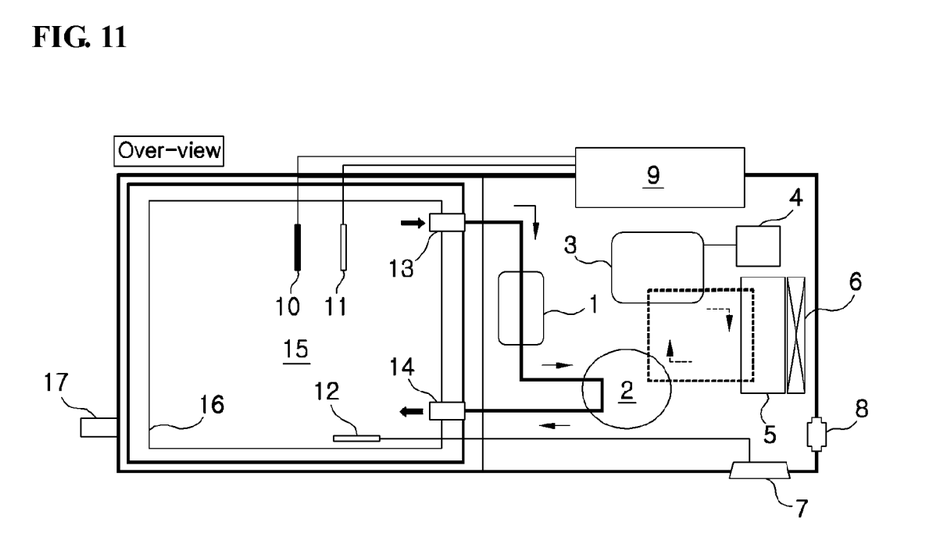

FIGS. 10 and 11 each show a side view and an upper surface view illustrating an exemplary artificial hibernation apparatus for artificially inducing marine animals into a dormant state of hibernation according to another embodiment of the present invention.

Referring to FIGS. 10 and 11, the apparatus for artificially inducing hibernation of marine animals comprises: an artificial dormant chamber (15) containing sea water including aquatic animals; a heat exchanger (2) or a cooler (5) for gradually lowering temperature of the sea water discharged from the artificial dormant chamber (15) according to a predetermined section and introducing the lowered temperature of sea water back into the artificial dormant chamber (15); temperature sensors (11, 12) for measuring the temperature of sea water contained in the artificial dormant chamber (15); an oxygen sensor (10) for measuring the level of dissolved oxygen contained in the sea water; and a personal computer (PC. 9) for controlling the heat exchanger or the cooler according to an artificial hibernation program, the program being such that temperature of the sea water lowered at each step can be maintained for a predetermined period of time, based on temperature information of the sea water received from the temperature sensors while increasing the predetermined period of time maintained at each step of decreased temperature. And, based on the information on the dissolved oxygen level received from the oxygen sensors, the period of maintaining constant temperature of the sea water gradually lowered at each step can be gradually decreased from the temperature of the sea water from which there is no deviation of the level of the dissolved oxygen consumed by the aquatic animals.

The PC (9) in the apparatus for inducing artificial hibernation of marine animals operatively controls the heat exchanger (2) or the cooler (5) to thereby bring or inducing the aquatic animals into a dormant state of hibernation. To this end, the apparatus for inducing artificial hibernation of marine animals may further include a compressor (3) and a pressure controller (4) for controlling the operation of the heat exchanger (2) or the cooler (5), and may further include a temperature controller (7) for controlling the temperature sensor, where the PC (9) controls the pressure controller (4) and the temperature controller (7), whereby the operation of the heat exchanger (2) or the cooler (5) may be controlled.

Now, the operation of the apparatus for inducing artificial hibernation of marine animals (hereinafter referred to as the "apparatus") will be described in detail with reference to the accompanying drawings.

The apparatus is basically designed to be used for both in fresh water and salt water, such that each pipe and constituent element contacting the water is made of PVC (Polyvinyl Chloride) material or titanium material which is resistant to degradation (e.g. rusting) in salt water. The apparatus may be largely divided into an artificial dormant chamber (15), a cooling apparatus and a water temperature control apparatus (PC).

Inner and outer walls of the artificial dormant chamber (15) are made of plastic material or titanium resistant to degradation in salt water, and are filled at a midsection thereof (thickness of 5 cm) with adiabatic epoxy for blocking heat from the outside, and include a cover. The chamber (15) has a volume of 500 liters into which 400 liters of water may be filled. The fine water temperature adjustments and changes made inside the chamber (15) both measured at PC (9), and the temperature controller (7) may be corrected by two temperature sensors (Pt 100 temperature sensors 11, 12). The dissolved oxygen (DO) inside the chamber (15) is measured by the oxygen sensor (10. Multiline P4, WTW, Germany) connected to the PC (9), and speed of the water (45 liter/min) is controlled by an inlet (14) and an outlet (13) disposed at the chamber (15) thereby maintaining the oxygen saturation of the water at 100%.

The chamber (15) may be a fishing net (16) capable of harvesting the aquatic animals from the sea water. To this end, it is preferred that the fishing net (16) be first installed in the chamber (15) before the aquatic animal is inserted into the chamber (15). The reason is that the flat fish such as halibuts is difficult to catch if they are lying flat on the floor, and it is easy to harvest the halibuts laying inside the fishing net (16) without much stress just by lifting the fishing net (16).

Successively, a cooling device for the apparatus (hereinafter referred to as cooling device) includes a pump (1) capable of processing 45 liters per minute, a heat exchanger (2) capable of heat exchanging 12,000 kcal per hour, a 2-horse power compressor (3), a pressure controller (4) and a cooler (5), where the direction of sea water passing through the cooling device is shown in solid lines in FIGS. 10 and 11. It is important that conditions of refrigerant circulating the heat exchanger (2), the compressor (3) and the pressure controller (4) be maintained in high pressure and low temperature (−25 degrees) in order to lower the temperature of sea water coming into the artificial hibernation chamber (15) using the cooling device. The circulation process of the refrigerant is illustrated in solid lines in FIGS. 10 and 11.

In this case, if the temperature of sea water passing through the heat exchanger (2) is too low, there may generate a problem in the heat exchanger (2). In other words, a small-diameter pipe in the heat exchanger (12,000 k cal/h) through which the sea water passes may cause rupture of the heat exchanger (2) due to freezing conditions inside the pipe. Therefore, it is preferred that pressure of the compressor (3) be automatically adjusted to lower the temperature of refrigerant to prevent the heat exchanger (2) from freezing, if the temperature of sea water passing through the pipe of the heat exchanger (2) goes down below a predetermined level. For example, if an inner temperature of the artificial hibernation chamber (15) is high (i.e., 13~4 degree Celsius), the compressor (3) increases in pressure to maintain the temperature of refrigerant at −25 degree Celsius, and if the temperature of sea water inside the artificial hibernation chamber (15) is low at approximately 1 degree Celsius, the compressor (3) decreases in pressure to maintain the temperature of the refrigerant at −1 degree Celsius, whereby the freezing of the heat exchanger (2) can be avoided (freezing temperature: −1.93 degree Celsius at salinity of 24.7%).

An LED (Light Emitting Diode) lamp, an indicator for malfunctions of cooling system is mounted at an upper end of the apparatus to allow quick response to occurrence of any problems. Temperature of the artificial hibernation chamber (15) is also automatically adjusted by the PC (9) and the temperature controller (7) through a pre-set program of the PC (9). The PC (9) may show whether the temperature adjustment of the artificial hibernation inducement process thus established is in normal operation. It is preferred that one cycle of artificially induced hibernation established by the PC program be in the range of 14~20 hours depending on the initial temperature, fish type and the fish size.

The apparatus is featured in such a fashion that the PC (9) controls the heat exchanger (2) or the cooler (5) to thereby enable to automatically induce the artificial dormant state of hibernation of marine animals inside the artificial hibernation chamber (15). At this time, the artificial inducement of hibernation of marine animals is the same as elucidated in the method for inducing artificial hibernation of marine animals thus described in which temperature of the sea water lowered at each phase can be maintained for a predetermined period of time, based on sea water temperature information received from the temperature sensors (11, 12) by the PC (9) while increasing the predetermined period of time maintained at each phase of decreased temperature, and based on the information on the dissolved oxygen level received from the oxygen sensors, the duration of maintaining constant temperature of the sea water gradually lowered at each step which is gradually decreased from the temperature of the sea water from which there is no deviation of the dissolved oxygen level. In addition, it is possible that the PC (9) can automatically induce a dormant state of hibernation of marine animals by the method according to other exemplary embodiments of the present invention.

As noted above, once the marine animals are induced into a dormant state of hibernation by adjusting the temperature of sea water and maintenance time by the apparatus, the marine animals may be put into a box capable of blocking the artificial hibernation induced marine animals from outside heat, i.e., the marine animals may be covered with moistened coverings to ensure a constant humidity, and the box may be sealed to allow the artificially hibernated marine animals to be hauled long distances for distribution.

If outside air or heat is introduced into the box containing the marine animals, temperature inside the box increases which "wake up" the artificially hibernating marine animals earlier than desired to an environment that is dangerous to their survival in their waken state or even poisonous to the marine animals, consequently killing large part of the transported marine animals. The present invention, therefore, has used boxes that can block the introduction of outside air or heat in order to keep the artificial dormant state of hibernation for a predetermined period of time. The inner temperature of the boxes is not particularly restricted but it was ascertained that maintenance of the inner temperature in the boxes to be in the range of 1 to 2 degree Celsius is most adequate for maintaining the artificial induced dormant state of the marine animals.

Although there is no need of water for transportation as the marine animals are induced into artificial dormancy of hibernation, wetted coverings were used for keeping humidity necessary for survival of the marine animals. In other words, it was found to be most desirable to cover the marine animals with soaked Korean traditional paper (hand-made from mulberry trees) for humidity preservation of 90% or more.

As described above, understanding of endogenous rhythms of the marine animals has enabled to artificially bring the marine animals into a dormant state of hibernation, and as a result, a simple packaging of the marine animals in boxes under waterless conditions has ensured a long survival rate (viability) of hibernating aquatic animals.

Preferably, the artificially induced dormant marine animals in the tightly sealed boxes are thereafter transported to market destinations, where the boxes are opened to allow the marine animals to be stocked into water in the range of 7 to 9 degree Celsius. The present invention is intended to transport the artificially induced dormant marine animals, particularly in aforementioned tightly sealed waterless boxes. Following the transport, if the marine animals are stocked into water with temperature range in 7 to 9 degree Celsius, the marine animals are waken up from the dormant state of hibernation in as short as a few seconds or in about 10 minutes, depending on the size of the marine animals.

The present invention, being quite different from the existing live fish transport method, is intended to provide an absolutely inventive skill and method in such a manner that endogenous rhythms of marine animals are observed, and artificial hibernating conditions are induced through several steps of temperature changes to stop endogenous rhythms of marine animals for a long period of time, and moved through waterless conditions, and to bring the marine animals back to original biorhythms, alive.

Now, preferred embodiments of the present invention will be described in detail with reference to the attached drawings.

It is needless to say that the present invention is not limited to, but may be better understood by the following embodiments. It is also to be understood that both the foregoing general description and the following preferred embodiments are exemplary and explanatory, and therefore not to be considered limiting the scopes as claimed.

The live halibuts used in the present experiments were harvested from Jeju Island in the southern part of Korea and bought through Ansan Agro-fishery Market. A total experimental live fish population was 290, where a total of 63 individuals was wrapped and transported in vinyl envelope or old newspaper according to the usual transportation method, and a total of 227 individuals was employed for artificially induce dormant hibernation for transport using the waterless conditions according to the present invention.

First Embodiment

Respiratory Activities and Analysis of Endogenous Rhythms of Halibuts

First of all, in order to understand the artificially induced dormant state of hibernation using endogenous biorhythms of marine animals, it is imperative to analyze metabolic activities associated with endogenous biorhythms of subject fish (alive).

Figure 3:
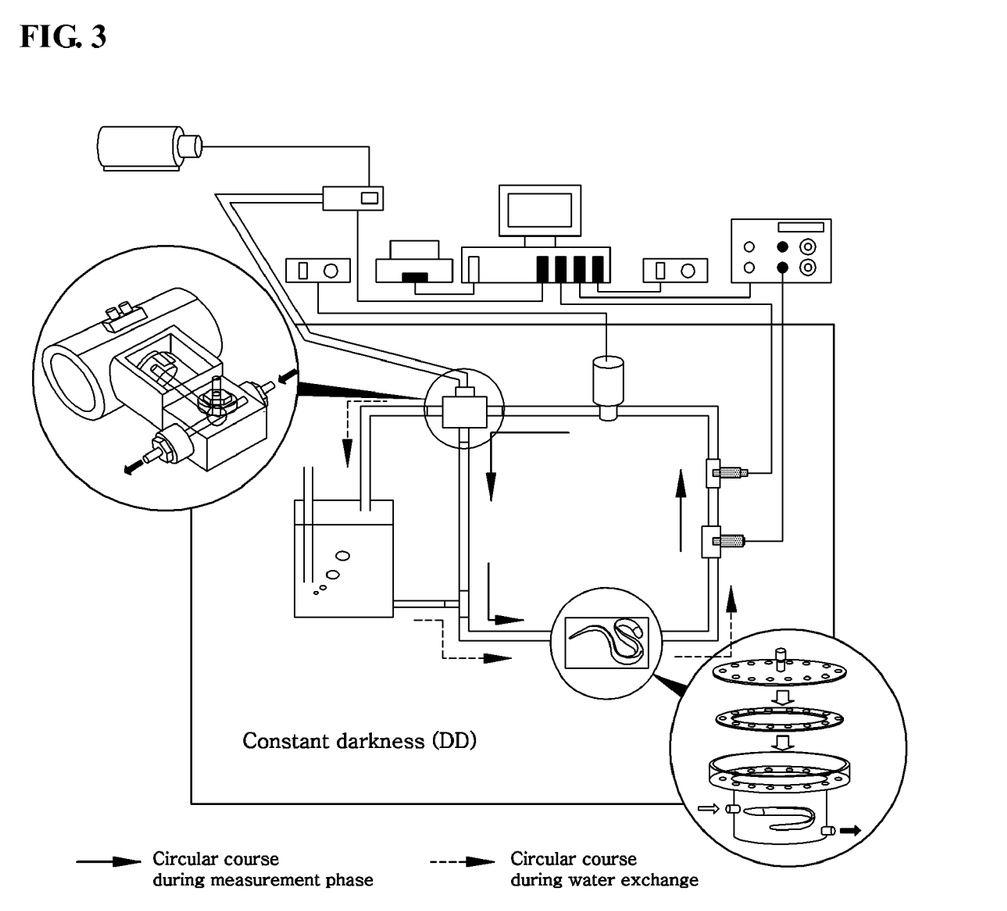
FIG. 3 is an exemplary structural view illustrating an automatic respiration measurement instrument capable of measuring oxygen requirements of marine animals for this present invention.

Experimental conditions are very important for measuring the endogenous biorhythms of live fish. The experimental conditions where at least two or more external environmental conditions are kept constant (Palmer 1995) may be considered endogenous biorhythms. Fish has eyes, and melanin pigmentation therein may be affected by light to have an influence on behaviors or metabolic activities of the fish, such that it is difficult to observe the endogenous biorhythms. BOD incubators (VS 1203P5N, Vison Co., Seoul, Korea) capable of blocking light and keeping the water temperature constant (FIG. 4: 19 degrees, FIG. 6: 21.5 degrees) were used for the method of the present invention. Analysis of endogenous biorhythms relative to respiratory activities of cultured halibuts was performed using an AIFR (Automatic Intermittent-Flow-Respirometer: FIG. 3) developed by the current inventors. The respiratory data continuously measured for 135 hours by the AIFR is shown in 2% moving average using a computer program (KaleidaGraphy, Synergy Software, Essex Junction, Vt., USA) according to the Least-squares Method (FIGS. 4 and 6). Periodical analysis of the endogenous biorhythms relative to respiratory activities of halibuts was made using MESA (Maximum Entropy Spectral Analysis) program. Continuous data of a constant time interval is needed for the endogenous biorhythm periodic analysis, and numerical values at each 10 minute interval were transformed to mean values using the data measured by the AIFR, which is analyzed by the MESA program to obtain a periodic analysis data shown in FIG. 5. As shown in FIG. 7, the cultured halibuts have shown a period of 24.8 hours almost conforming to a period of 24 hours. However, wild marine fish stocks or marine animals have shown quite different styles when respirations thereof were continuously observed by the AIFR as illustrated in FIG. 6. FIG. 6 illustrates a result of respirations of manila clams (*Ruditapes philippinarum*) continuously measured in BOD incubators (under dark environment and constant water temperature of 21.5 degrees) for 260 hours by the AIFR. As a result of analysis by 2% moving average, there were two strong peaks per day, and when the data was analyzed using the MESA program, the respirations of manila clams were greatly affected by tidal influence of 12.2 hours as shown in FIG. 7, and a period of 25.1 hours was also observed. As understood from the endogenous biorhythm experiments of manila clams, it can be noted that biorhythms of marine animals are different according to habitats. If the respirations of marine animals are measured by the AIFR for a long time, the endogenous biorhythms of the marine animals can be observed, which may be an important fundamental data for inducing an artificially induced dormant state of hibernation of marine animals.

Second Embodiment

Changes of Mean Oxygen Consumption of Halibuts in Response to Decrease in Sea Water Temperature Based on respiratory activities and endogenous biorhythm analysis method as well as analytical data of halibuts according to the above first embodiment, sea water temperature at a point was determined where changes of oxygen consumption by marine animals were greatly reduced, or changes of oxygen consumption were almost nothing, by lowering the temperature of sea water with the marine animals and using the apparatus for inducing artificial hibernation of marine animals according to the present invention.

Figure 9:
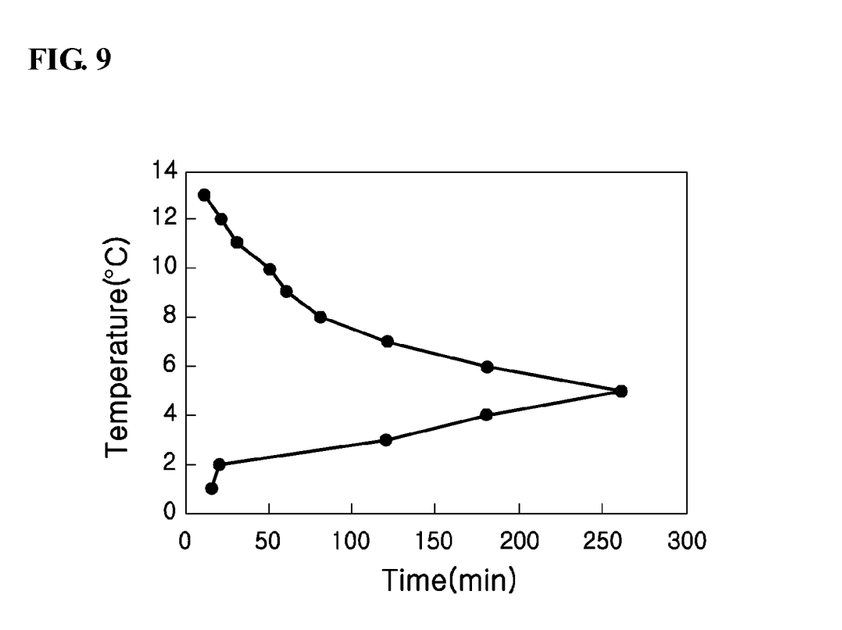
FIG. 9 is an exemplary graph illustrating gradually increased period of organisms maintained at a predetermined temperature in response to the gradually decreased sea water temperature.

As a result, there has been no problem of survival for halibuts stored at 13 degree Celsius even if temperature was reduced to 10 degrees, as evidenced in FIG. 8. As illustrated in FIG. 9, the sea water temperature was kept at 13 degrees for 10 minutes, and duration was prolonged in response to decrease in water temperature, i.e., approximately 20 minutes at 12 degrees, approximately 30 minutes at 11 degrees. The time duration at 6 degrees was prolonged to 120 minutes which is 12 times the exposure period (10 minutes) of an initial 13 degrees of water temperature, to 180 minutes at 5 degree Celsius, and to 260 minutes at 4 degree Celsius (where biorhythms cease) which is the longest exposure time in order to minimize the stress. Furthermore, the exposure time was gradually reduced as the sea water temperature decreases. In other words, halibuts were manipulated to stay alive in the sea water by reducing the exposure time. i.e., 180 minutes at 3 degree Celsius, 120 minutes at 2 degree Celsius and 20 minutes at 1 degree Celsius of sea water temperatures. Finally, the halibuts were exposed for 15 minutes at 0.2 degree Celsius below zero.

The embodiment of gradual decrease in water temperature while the water temperature maintaining period is gradually increased in phase according to the gradually reduced water temperature illustrated in FIG. 9, and the water changes are automatically adjusted by the computer program of the present invention. It was ascertained from the repeated experiments that stress to the marine animals could be most desirably reduced at a point of 13 degree Celsius where the marine animals could be induced to the artificial dormancy of hibernation, and where it took approximately 20 hours to induce the marine animals to the dormant state of hibernation.

At the same time, based on a graph with regard to the changes of mean oxygen consumption rate of marine animals in response to the water temperature as illustrated in FIG. 8, Table 1 is provided to define maximum and minimum values of oxygen consumption consumed by the halibuts at a predetermined reference temperature, amplitude of changes in oxygen consumption resultant thereby, and inclinations of mean oxygen consumption rates at each temperature section.

TABLE 1

AMPLITUDES OF OXYGEN CONSUMPTION BY HALIBUTS AND INCLINATIONS AT EACH TEMPERATURE SECTION

| | | Temp. (□) | | | | | | | |
|---|---|---|---|---|---|---|---|---|---|
| | | 13 | 10 | 8 | 6 | 5 | 4 | 3 | 2 |
| Oxygen consumption ($ml\ O_2\ kg^{-1}\ WW\ h^{-1}$) amplitudes (by 5% moving average) and Average | Maximum (A) | 23.8 | 17.7 | 16.6 | 12.5 | 8.4 | 6.2 | 6.1 | 6.1 |
| | Minimum (B) | 11.6 | 10.8 | 10.2 | 7.0 | 6.1 | 6.1 | 6.1 | 6.1 |
| | Amplitude (A − B) | 12.2 | 6.9 | 6.4 | 5.5 | 2.3 | 0.1 | 0.0 | 0.0 |
| | Average (C) | 17.7 | 14.3 | 13.4 | 9.8 | 7.3 | 6.2 | 6.1 | 6.1 |
| Inclination for each temperature section (A − B) | | 1.77 | | 0.25 | 0.25 | 2.7 | | 0.05 | |

As shown in Table 1, an inclination in response to oxygen consumption amplitude of halibuts stands at 1.77 when the temperature decreases from 13 to 10 degree Celsius. The inclination stands at 0.25 for both cases of the temperatures being reduced from 10 to 8 degree Celsius, and 8 to 6 degree Celsius, which are smaller value compared with that of a case of the temperature being lowered from 13 to 10 degree Celsius. Consequently, it may be determined that a section where the temperature decreased from 10 to 6 degree Celsius showed no big changes in terms of respirations and metabolic activities of the halibuts. However, a section where the temperature decreases from 6 degrees to 4 degrees showed a robust inclination of 2.7, which confirms that there is a great change of metabolic activities at this temperature range. The oxygen consumption was almost constant (6.1 ml $O_2$ $kg^{-1}$ WW $h^{-1}$) at temperatures below 4 degree Celsius, and inclination stood at 0.05, which showed that such temperature changes had little influence on the oxygen consumption at such conditions.

Third Embodiment

Experiments of Artificial Hibernation Using Halibuts and Other Live Fish

Successively, the artificially induced hibernating live fish and live halibuts covered thereon with the wet Korean traditional papers were put into a box that maintains an inner temperature at 5 degree Celsius, and sealed and stored. As the storage time lapses, a recording was made on the duration for the waterless conditions for the live fish and the halibuts, and the survival rate (viability) of the live fish and halibuts, the result of which is shown in the following Table 2.

TABLE 2

EXPERIMENTAL RESULTS OF ARTIFICIAL HIBERNATION USING LIVE HALIBUTS AND OTHER LIVE FISH

| Experiments | Populations | Individual weight | Status of pre-treatment for temperature changes | Utilization of traditional Korean paper | Waterless condition maintenance period | Survival rate |
|---|---|---|---|---|---|---|
| Existing method (no use of artificially induced hibernation) | 63 | 820-1060 g | x | x | 12-15 hours | 20-30% |
| Induced artificial hibernation & waterless condition packaging techniques | 140 | 720-1340 g | 0 | 0 | 18-24 Hours | 90-100% |
| Induced artificial hibernation & waterless condition packaging techniques | 87 | 2020-2740 g | 0 | 0 | 18-24 hours | 90-100% |

As evidenced in Table 2, the halibuts and other live fish subjected to the induced artificial hibernation and waterless condition packaged transport method according to the present invention have a longer waterless condition time than that of the transport method of live fish wrapped in vinyl or old newspaper according to the previous common method.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the method without departing in any way from the basic nature of the present invention.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follows.

INDUSTRIAL APPLICABILITY

There is an advantage in the method and apparatus for inducing artificial hibernation of marine animals thus described according to the present invention in that marine animals can be artificially induced to a dormant state of hibernation and as a result, the artificially induced hibernating marine animals in waterless conditions simply wrapped in paper package can be ensured of a long survival rate (viability). Another advantage is that gradual step-by-step changes of sea water temperature can artificially induce hibernation conditioned of marine animals which can be maintained in the waterless conditions.

What is claimed is:

1. An apparatus for inducing artificial hibernation of marine animals, comprising: an artificial dormant chamber containing sea water including marine animals; a heat exchanger or a cooler for gradually lowering the temperature of the sea water discharged from the artificial dormant chamber and returning the lowered temperature sea water to the artificial dormant chamber; temperature sensors for measuring the temperature of sea water contained in the artificial dormant chamber; an oxygen sensor for measuring the level of dissolved oxygen contained in the sea water; and a computer for controlling the heat exchanger or the cooler according to an artificial hibernation software program, the program being such that the temperature of the sea water lowered at each phase can be maintained for a predetermined period of time, based on information of the sea water temperature received from the temperature sensors, and information on the dissolved oxygen level received from the oxygen sensor.

2. The apparatus as claimed in claim 1, wherein the artificial dormant chamber includes a fishing net capable of harvesting the marine animals from the sea water.

3. A method for inducing artificial hibernation of marine animals, comprising:
   (a) maintaining the marine animals in sea water for a predetermined period of time and monitoring the amount of mean oxygen consumption by the marine animals in the sea water;
   (b) gradually reducing the sea water temperature on a step-wise basis for a first plurality of subsequent steps in accordance with the amount of oxygen consumed by said marine animals during each subsequent step, wherein the sea water temperature is kept constant for a predetermined period of time in a plurality of predetermined periods of time corresponding to the plurality of subsequent steps, wherein said predetermined period of time increases during each subsequent step that the temperature is reduced until a temperature is reached wherein there is no deviation of mean oxygen consumption by the marine animals during the predetermined period of time for the subsequent step; and
   (c) then continuing to gradually reduce the sea water temperature on a further step-wise basis for a second plurality of subsequent steps and gradually reducing the predetermined periods of time during which the sea water temperature is decreased until artificial hibernation of the marine animals occurs.

4. The method as claimed in claim 3, wherein the marine animal is live halibut or other live fish.

5. A method for inducing artificial hibernation of marine animals, comprising:
   (a) maintaining the marine animals in sea water for a predetermined period of time and monitoring the amount of mean oxygen consumption by the marine animals in the sea water;
   (b) gradually reducing the sea water temperature on a step-wise basis for a first plurality of subsequent steps in accordance with the amount of oxygen consumed by said marine animals during each subsequent step, wherein the sea water temperature is kept constant during each predetermined period of time in a plurality of predetermined periods of time, wherein the predetermined period of time increases during each subsequent step that the temperature is decreased;
   (c) then continuing to gradually reduce the sea water temperature on a further step-wise basis for a second plurality of subsequent steps wherein the predetermined period of time that is maintained during each step-wise reduction of sea water temperature, starting from a sea water temperature wherein the oxygen consumed by the marine animals is 1.5 to 4 times smaller than the initial oxygen consumption or where the deviation of oxygen consumption by the marine animals is in the range of 6.0 ml $O_2$ $kg^{-1}$ WW $h^{-1}$~0.01 ml $O_2$ $kg^{-1}$ WW $h^{-1}$.

6. The method as claimed in claim 5, wherein the marine animal is live halibut or other live fish.

7. A method for inducing artificial hibernation of marine animals, comprising:
   (a) maintaining the marine animals in sea water for a first predetermined period of time at a first predetermined temperature and monitoring the amount of mean oxygen consumption by the marine animals during said first predetermined period of time;
   (b) gradually reducing the sea water temperature to a second predetermined temperature for a second predetermined period of time that is 10 to 25 times longer than the first predetermined period of time, and wherein the mean oxygen consumption during the second predetermined period of time is 1.5 to 2.5 times lower than the amount of mean oxygen consumption during the first predetermined period of time; and
   (c) then continuing to gradually reduce the sea water temperature to a third predetermined temperature, for a third predetermined period of time that is 26 to 100 times longer than the first predetermined period of time, and wherein the mean oxygen consumption is 3 to 4 times lower than the mean oxygen consumption during the first predetermined period of time.

8. The method as claimed in claim 7, wherein the first predetermined temperature is in the range of 14~12 degrees Celsius, the second predetermined temperature is in the range of 7~5 degrees Celsius, and the third predetermined temperature is in the range of 5~3 degrees Celsius.

9. The method as claimed in claim 7, wherein the marine animal is live halibut or other live fish.

10. A method for inducing artificial hibernation of marine animals, comprising:
   (a) maintaining marine animals in sea water for three predetermined periods of time at three predetermined temperatures, and monitoring the amount of mean oxygen consumption by the marine animals during each predetermined period of time;
   (b) gradually reducing the sea water temperature during the second and third periods of time wherein the third period of time is 10 to 100 times longer than the first period of time and wherein the amount of mean oxygen consumption is 3 to 4 times lower than the amount of mean oxygen consumption during the first period of time.

11. The method as claimed in claim 10 wherein the earliest first predetermined temperature is 13 degrees Celsius, and the third predetermined temperature is 4 degrees Celsius.

12. The method as claimed in claim 10, wherein the marine animal is live halibut or other live fish.

13. A method for inducing artificial hibernation of marine animals, comprising:
   (a) maintaining marine animals in sea water at a first temperature for a first period of time and monitoring the amount of oxygen consumption by the marine animals;
   (b) reducing the sea water temperature to a second temperature for a second period of time that is 10 to 25 times longer than the first period of time, and wherein the difference between the maximum and minimum oxygen consumption by the marine animal is in the range of 6.0 ml $O_2$ $kg^{-1}$ WW $h^{-1}$~0.0 ml $O_2$ $kg^{-1}$ WW $h^{-1}$; and
   (c) further reducing the sea water temperature to a third temperature for a third period of time that is 26 to 100 times longer than the first period of time and wherein the difference between the maximum and minimum oxygen consumption by the aquatic animal is in the range of 1.1 ml $O_2$ $kg^{-1}$ WW $h^{-1}$~0.0 ml $O_2$ $kg^{-1}$ WW $h^{-1}$.

14. The method as claimed in claim 13, wherein the first predetermined temperature is in the range of 14~12 degrees Celsius, the second predetermined temperature is in the range of 7~5 degrees Celsius, and the third predetermined temperature is in the range of 5~3 degrees Celsius.

15. The method as claimed in claim 13, wherein the marine animal is live halibut or other live fish.

16. A method for inducing artificial hibernation of marine animals, comprising:
   (a) maintaining marine animals is sea water for three predetermined periods of time at three predetermined temperatures, and monitoring the amount of oxygen consumption by the marine animals during each predetermined temperature;
   (b) gradually reducing the sea water temperature during the second and third periods of time wherein the third period of time is 10 to 100 times longer than the first period of time and wherein the difference between the maximum and minimum oxygen consumption by the marine animal is in the range of 1.1 ml $O_2$ $kg^{-1}$ WW $h^{-1}$~0.0 ml $O_2$ $kg^{-1}$ WW $h^{-1}$.

17. The method as claimed in claim 16, wherein the first predetermined temperature is 13 degrees Celsius, and the third predetermined temperature is 4 degrees Celsius.

18. The method as claimed in claim 16, wherein the marine animal is live halibut or other live fish.

* * * * *